United States Patent
Martí Sala et al.

(10) Patent No.: US 9,567,162 B2
(45) Date of Patent: Feb. 14, 2017

(54) ROTARY CONVEYOR WITH SUCTION AND CHANGE OF PITCH FOR TRANSFERRING CONTAINERS

(71) Applicants: Jaime Martí Sala, Barcelona (ES); Alex Martí Mercadé, Sant Cugat del Vallès (ES)

(72) Inventors: Jaime Martí Sala, Barcelona (ES); Alex Martí Mercadé, Sant Cugat del Vallès (ES)

( * ) Notice: Subject to any disclaimer, the term of this patent is extended or adjusted under 35 U.S.C. 154(b) by 0 days.

(21) Appl. No.: 15/044,780

(22) Filed: Feb. 16, 2016

(65) Prior Publication Data
US 2016/0244270 A1     Aug. 25, 2016

(30) Foreign Application Priority Data

Feb. 20, 2015   (EP) .................................... 15380005

(51) Int. Cl.
*B65G 47/26* (2006.01)
*B65G 29/00* (2006.01)
*B65G 47/28* (2006.01)
*B65G 47/84* (2006.01)

(52) U.S. Cl.
CPC ............... *B65G 47/28* (2013.01); *B65G 29/00* (2013.01); *B65G 47/848* (2013.01); *B65G 2201/0244* (2013.01)

(58) Field of Classification Search
CPC ....... B65G 29/00; B65G 47/26; B65G 47/843; B65G 47/846; B65G 47/848
USPC ..................... 198/459.1, 459.2, 471.1, 689.1
See application file for complete search history.

(56) References Cited

U.S. PATENT DOCUMENTS

| | | | |
|---|---|---|---|
| 2,860,761 A * | 11/1958 | Kocan | H01J 9/46 198/471.1 |
| 3,731,715 A * | 5/1973 | Gageant | B65B 3/326 198/459.2 |
| 4,825,994 A * | 5/1989 | Gomann | A24C 5/327 198/689.1 |
| 5,197,586 A | 3/1993 | Marti Sala | |
| 5,297,666 A | 3/1994 | Marti Sala | |
| 5,769,203 A | 6/1998 | Marti Sala | |
| 6,033,156 A | 3/2000 | Marti Sala | |
| 6,079,546 A | 6/2000 | Marti Sala | |
| 6,116,406 A | 9/2000 | Marti Sala | |
| 6,457,610 B1 | 10/2002 | Marti-Sala | |

(Continued)

FOREIGN PATENT DOCUMENTS

| EP | 2226277 B1 | 9/2010 |
|---|---|---|
| EP | 2722296 A1 | 4/2014 |

*Primary Examiner* — James R Bidwell
(74) *Attorney, Agent, or Firm* — Robert J. Hess; Hess Patent Law Firm

(57) ABSTRACT

The conveyor has a plurality of sliding runners (5) coupled to guiding elements (2) that are fixed to a rotary platform (1). Each runner (5) has fixed thereto a cam follower (6) inserted in a groove (3) of the rotary platform (1) and coupled to a stationary closed-loop cam (4), and a retaining element (7) having a suction port (8) for retaining a container (M) and a suction outlet (9) in communication with the suction port (8). A stationary suction chamber (10) located above the rotary platform (1) has a perforated side wall (11) parallel to a portion of the closed-loop cam (4). Each suction outlet (9) moves in a path facing and adjacent to the perforated side wall (11) of the suction chamber (10) during a part of each rotation of the rotary platform.

18 Claims, 5 Drawing Sheets

(56) References Cited

U.S. PATENT DOCUMENTS

| | | |
|---|---|---|
| 7,134,540 B1 | 11/2006 | Marti Sala |
| 7,258,222 B2 | 8/2007 | Marti Sala |
| 7,374,032 B2 | 5/2008 | Marti Mercade |
| 7,950,517 B2 | 5/2011 | Marti Sala |
| 8,051,971 B2 | 11/2011 | Marti Sala |
| 8,096,403 B2 | 1/2012 | Marti Sala |
| 8,739,961 B2 | 6/2014 | Marti Sala |
| 2002/0112939 A1* | 8/2002 | Sumi ............... A61F 13/15764 198/459.2 |
| 2004/0262127 A1* | 12/2004 | Harnish ............... B65G 29/00 198/459.8 |
| 2013/0126306 A1* | 5/2013 | Rack ............... B65G 29/00 198/689.1 |

\* cited by examiner

ROTARY CONVEYOR WITH SUCTION AND CHANGE OF PITCH FOR TRANSFERRING CONTAINERS

FIELD OF THE ART

The present invention relates to a rotary conveyor with suction and change of pitch, useful for transferring containers from an infeed conveyor to an outfeed conveyor, where the containers are conveyed by the infeed conveyor at a receiving pitch, i.e., separated from one another by a first distance, and delivered to the outfeed conveyor at a delivery pitch, i.e., separated from one another by a second distance different from the receiving pitch.

BACKGROUND OF THE INVENTION

Document EP 2226277 B1 describes a rotary conveyor for transferring containers comprising a rotor operated by a motor for rotating about a rotation axis. The rotor has a perimetric wall with a plurality of suction openings distributed along its periphery in correspondence with retaining elements configured for being coupled with the containers. In an inner region of the perimetric wall of the rotor, there is a stationary suction chamber connected to a low pressure source. The suction chamber defines a laterally open channel facing the perimetric wall along a predetermined circumferential arc, such that the suction chamber is partly demarcated by the perimetric wall of the rotor and such that when the rotor rotates, the suction openings are communicated directly with the suction chamber along the predetermined circumferential arc. As the rotor rotates, a container is retained in each of the retaining elements by suction at the start of the predetermined circumferential arc, conveyed by the rotor along the predetermined circumferential arc, and released at the end of the predetermined circumferential arc.

Document EP 2722296 A1 discloses a rotary conveyor with suction and change of pitch for transferring containers, comprising a rotary platform rotating about a rotation axis, a plurality of guiding elements fixed to the rotary platform and a plurality of grooves parallel to the guiding elements formed in the rotary platform. The guiding elements and grooves are uniformly distributed around the rotation axis and extend from a peripheral region to a central region of the rotary platform. A stationary closed-loop cam defining a path not centered with respect to the rotation axis is located below the rotary platform. Each guiding element has coupled thereto a runner provided with a cam follower inserted through the corresponding groove and coupled to the closed-loop cam, such that each runner performs a back and forth movement along the corresponding guiding element during one rotation of the rotary platform.

In the rotary conveyor of the mentioned document, EP2722296A1, each runner has fixed thereto a retaining element provided with a suction port suitable for retaining a container, and each suction port is in communication with a suction chamber through a corresponding suction conduit. The suction chamber is located in a stationary position below the rotary platform and has an upper wall in contact with a lower surface of the rotary platform. The closed-loop cam and a suction groove parallel to a portion of the path defined by the closed-loop cam are formed in this upper wall of the suction chamber. The suction conduit of each runner has an open lower end which communicates with the suction chamber through an intersection of the corresponding groove formed in the rotary platform and the suction groove formed in the suction chamber, and this open lower end of the suction conduit follows the changing position of the mentioned intersection during the back and forth movement of the runner occurring during a part of each rotation of the rotary platform.

The rotary conveyor of the mentioned document EP2722296A1 has several drawbacks. First, the fact that the upper wall of the suction chamber is in contact with a lower surface of the rotary platform can generate considerable friction resulting in unacceptable component wear and/or heating. Furthermore, the fact that both the closed-loop cam and the suction groove are formed in the upper wall of the suction chamber makes it necessary to replace the entire suction chamber when only the path of the closed-loop cam is to be modified. On the other hand, using grooves formed in the rotary platform both for the passage of the corresponding cam followers and for the passage of air at their intersections with the suction groove requires high precision in the paths of the closed-loop cam, the grooves formed in the rotary platform and the suction groove for obtaining an acceptable air flow rate in any position without considerable losses, which imposes certain limitations in the design of such paths.

DISCLOSURE OF THE INVENTION

The present invention contributes to mitigate the foregoing and other drawbacks by providing a rotary conveyor with suction and change of pitch for transferring containers, which comprises a rotary platform rotating about a rotation axis, a plurality of guiding elements fixed to said rotary platform, and a plurality of grooves formed in the rotary platform. Each of the grooves is arranged in a position parallel to one of the guiding elements, and both the guiding elements and the grooves are uniformly distributed around the rotation axis and extend from a peripheral region to a central region of the rotary platform.

A closed-loop cam is located in a stationary position below the rotary platform. The closed-loop cam defines a path not centered with respect to the rotation axis of the rotary platform.

The rotary conveyor includes a plurality of runners. Each of the runners is slidingly coupled to one of the guiding elements and has a cam follower assembled thereon. Each cam follower is inserted through one of the grooves of the rotary platform and coupled to the closed-loop cam. Therefore, each runner performs a back and forth movement along the corresponding guiding element during one rotation of the rotary platform because the corresponding cam follower follows the path not centered with respect to the rotation axis of the closed-loop cam during rotation of the rotary platform.

Each of the runners has fixed thereto a retaining element having a suction port suitable for retaining a container and facing the peripheral region of the rotary platform. The suction port of each retaining element is in communication with a suction chamber along a portion of each rotation of the rotary platform.

The mentioned suction chamber is supported in a stationary position above the rotary platform and has an air outlet connected to a low pressure source and a perforated side wall parallel and adjacent to a portion of the path not centered with respect to the rotation axis defined by the closed-loop cam. Air is suctioned from the outside into the suction chamber through the mentioned perforated side wall. The perforated side wall preferably has a plurality of holes uniformly distributed along the length and width thereof, and the sum of the area of passage of all the holes is approximately equivalent to the area of passage of the air outlet of the suction chamber.

Each of the retaining elements furthermore has a suction outlet on a side opposite the suction port and facing the central region of the rotary platform, the suction outlet being in communication with the suction port. The suction outlet of each retaining element moves in a path facing and adjacent to the perforated side wall of the suction chamber during a part of each rotation of the rotary platform, thereby causing air suction flow through the suction port of each retaining element capable of retaining a container in the retaining element by suction.

With this construction and as a result of the back and forth movement of the runners, the distance between each retaining element and the rotation axis, i.e., the radius of rotation of each rotating element, changes from an outer limit position to an inner limit position and again to the outer limit position during each complete rotation of the rotary platform, while the suction outlets of the respective retaining elements remain in communication with the suction chamber during a portion of each complete rotation of the rotary platform.

Changes in the radius of rotation of the rotating elements involve a change of pitch, i.e., in the distance separating each two adjacent retaining elements, during rotation of the rotary platform.

Therefore, the rotary conveyor receives in a first angular receiving position successive containers conveyed by an infeed conveyor at a receiving pitch and delivers them in a second angular delivery position to an outfeed conveyor at a delivery pitch different from the receiving pitch.

In one embodiment, the angular receiving position substantially coincides with the outer limit position of the runners and the angular delivery position substantially coincides with the inner limit position of the runners, such that the pitch decreases from the angular receiving position to the angular delivery position.

In another alternative embodiment, the angular receiving position substantially coincides with the inner limit position of the runners, and the angular delivery position substantially coincides with the outer limit position of the runners, such that the pitch increases from the angular receiving position to the angular delivery position.

Preferably, in either one of both embodiments, the start of the perforated side wall of the suction chamber substantially coincides with the angular receiving position, although it is not essential for the perforated side wall of the suction chamber to cover the entire path of the runners between the angular receiving position and the angular delivery position.

The speeds and accelerations at which each runner moves along its corresponding guiding element as well as the amplitude of the back and forth movement thereof between an outer limit position and an inner limit position are determined by the non-centered path of the closed-loop cam.

In one embodiment, the path not centered with respect to the rotation axis defined by the closed-loop cam is a circular path having a center located at an off-center distance from the rotation axis of the rotary platform. In this case, the amplitude of the back and forth movement is equal to two times the mentioned off-center distance.

Given that the closed-loop cam is independent of the suction chamber, when speeds and amplitude of the back and forth movement of the runners are to be changed, a closed-loop cam can simply be replaced with another suited to the new needs without having to replace or modify the suction chamber at all.

BRIEF DESCRIPTION OF THE DRAWINGS

The foregoing and other advantages and features will be better understood from the following detailed description of a merely illustrative and non-limiting embodiment with reference to the attached drawings, in which.

DETAILED DESCRIPTION OF AN EMBODIMENT

Figure 1:
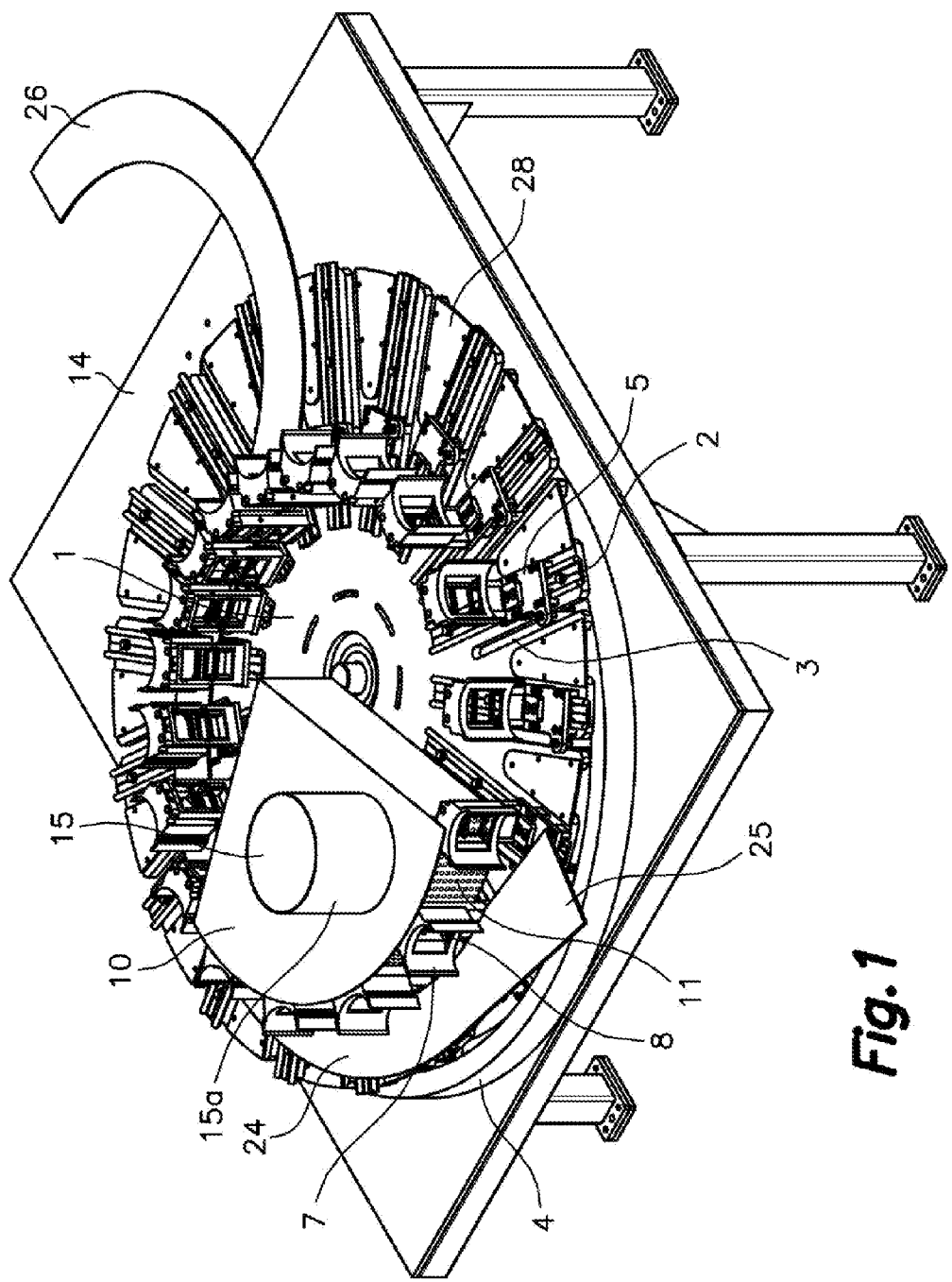
FIG. 1 is a perspective view of a rotary conveyor with suction and change of pitch for transferring containers according to an embodiment of the present invention.
Figure 2:
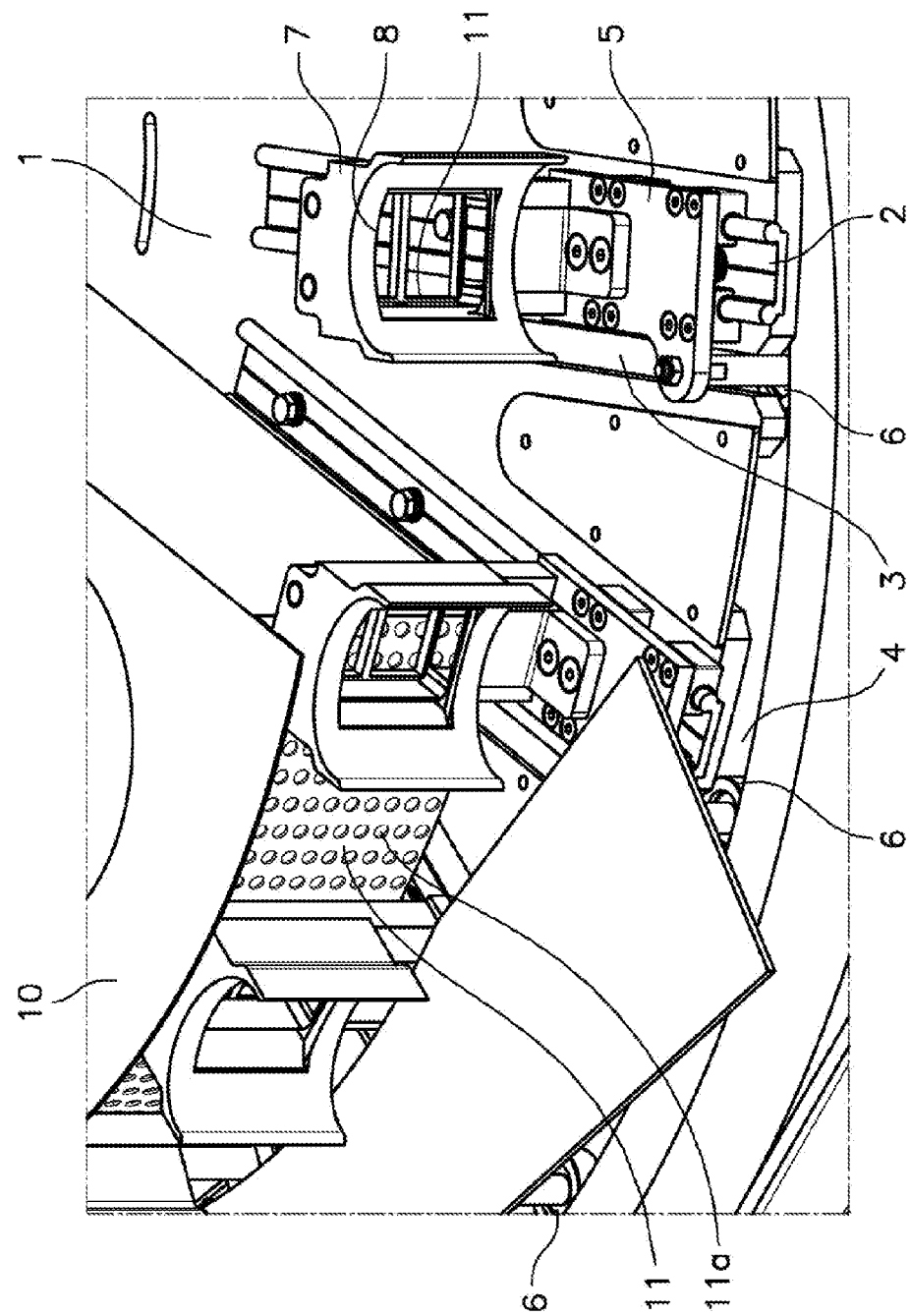
FIG. 2 is an enlarged detail of FIG. 1.

FIGS. 1 to 4 show a rotary conveyor with suction and change of pitch for transferring containers according to an embodiment of the present invention, comprising a mount 14 having a horizontal surface on which a closed-loop cam 4 is fixed in a stationary position. The mount 14 furthermore supports a drive shaft 16 by means of ball bearings 18 (FIG. 4), such that the drive shaft 16 can rotate about a vertical rotation axis E. The drive shaft 16 has fixed thereto a driven sheave 19 (FIG. 3) which is part of a mechanical transmission connecting the driven sheave 19 fixed to the drive shaft 16 to a drive sheave (not shown) operated by a motor (not shown) such that the motor rotates the drive shaft 16 about the rotation axis E.

Figure 3:
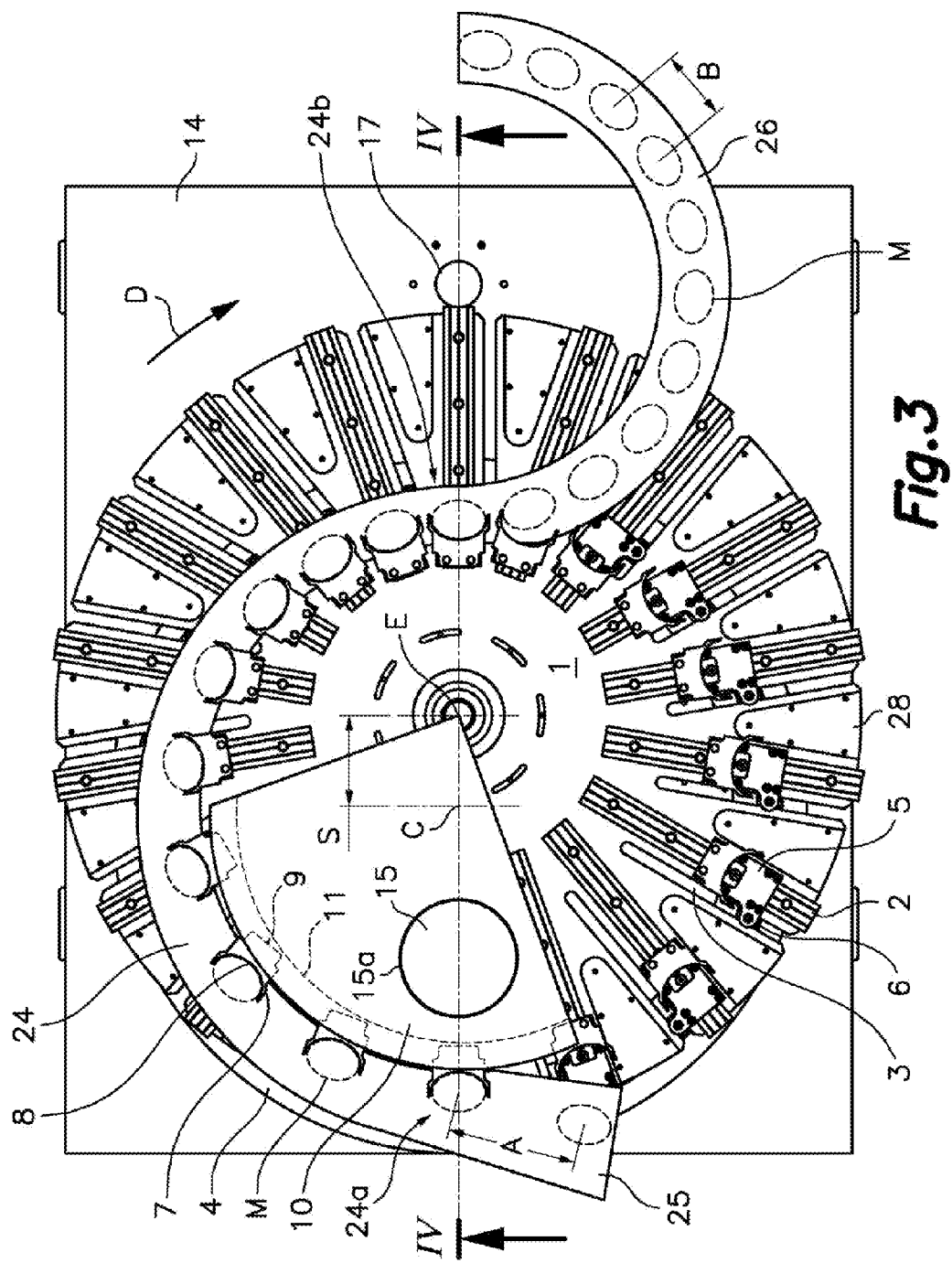
FIG. 3 is a top view of the rotary conveyor of FIG. 1.
Figure 4:
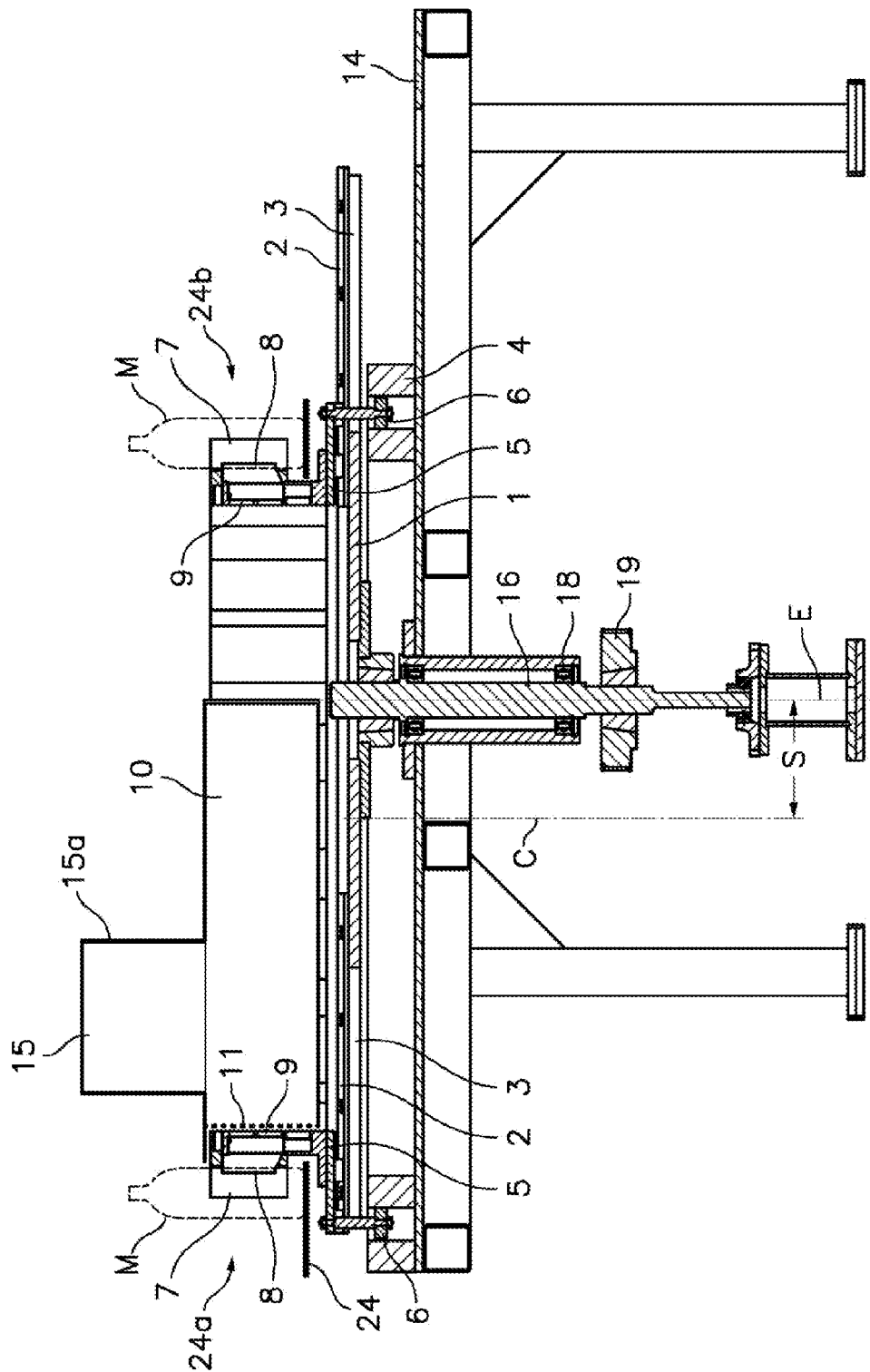
FIG. 4 is a cross-section view taken along plane IV-IV of FIG. 3.

An upper end of the drive shaft 16 is fixed to a rotary platform 1 located above the closed-loop cam 4, such that the rotary platform 1 rotates together with drive shaft 16 about the rotation axis E in the direction indicated by means of arrow D in FIG. 3.

Figure 5:
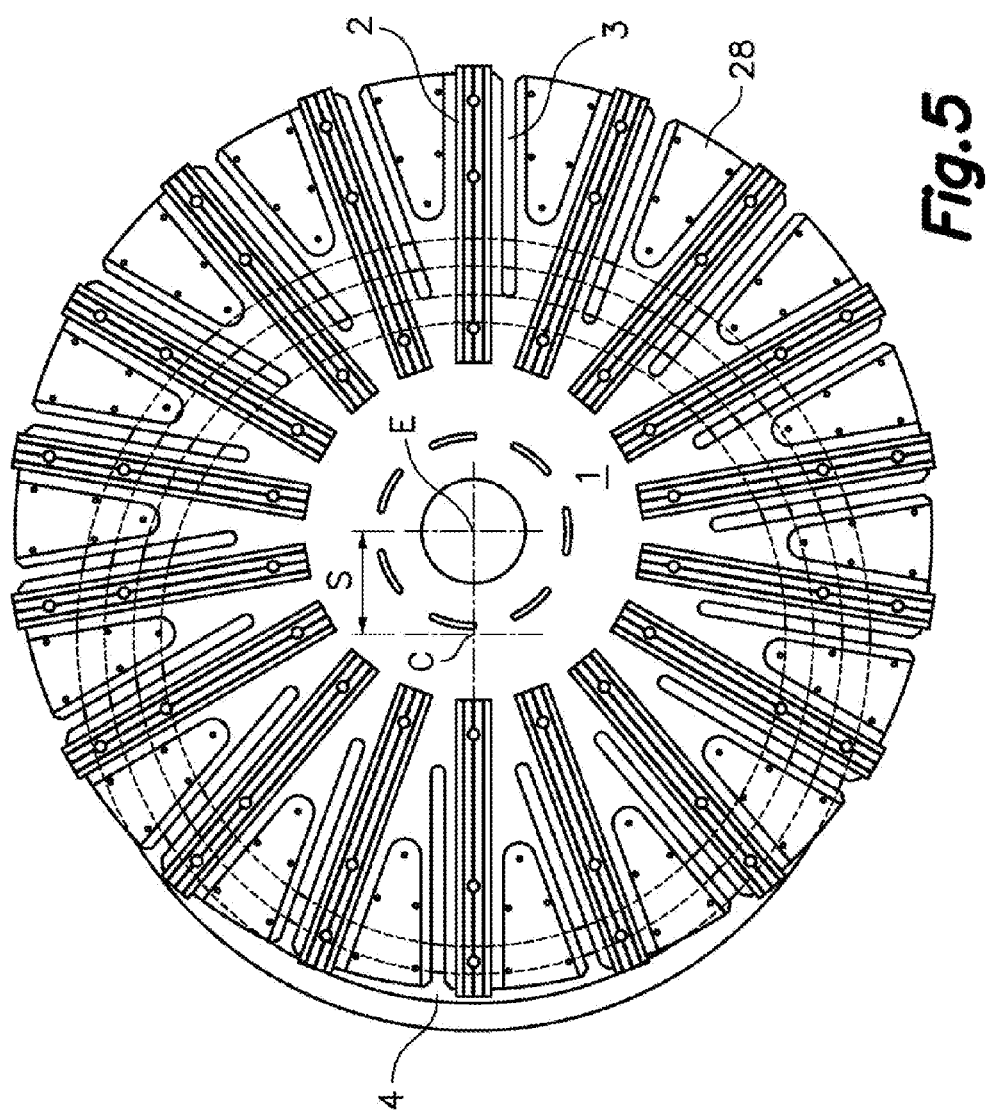
FIG. 5 is a top view of a rotary platform and a closed-loop cam which are part of the rotary conveyor of FIG. 1.

As best shown in FIG. 5, the closed-loop cam 4 defines a circular path having a center C not centered with respect to the rotation axis E. In fact, the center C of the circular path of the closed-loop cam 4 is located at an off-center distance S from the rotation axis E of the rotary platform 1. It must be pointed out that although the drawings show a closed-loop cam having a circular path, the closed-loop cam could alternatively define other non-circular and non-centered paths with respect to the rotation axis E of the rotary platform 1 with an equivalent result.

A plurality of guiding elements 2 uniformly distributed around the rotation axis E are fixed on an upper surface of the rotary platform 1, and a plurality of grooves 3 are formed through the rotary platform 1, each groove 3 being located in a position parallel and adjacent to one of the guiding elements 2. Both the guiding elements 2 and the grooves 3 extend from a peripheral region to a central region of the rotary platform 1, as best shown in FIG. 5. In the illustrated example, the guiding elements 2 are arranged in radial positions.

Each of the guiding elements 2 has slidingly coupled thereto a runner 5 having fixed thereto a downwardly projecting cam follower 6 which is inserted through the corresponding groove 3. The cam followers 6 of all the runners 5 are coupled to the closed-loop cam 4 (FIGS. 3 and 4), such that when the rotary platform rotates about the rotation axis E, and in accordance with the eccentricity of the closed-loop cam 4, each runner 5 performs a back and forth movement along the corresponding guiding element 2 during one rotation of the rotary platform 1.

In the illustrated embodiment, the closed-loop cam 4 defines a groove provided with opposing side surfaces, and each cam follower 6 comprises a freely rotating wheel rolling alternately on both of the opposing side surfaces of the groove of the closed-loop cam 4 during one complete rotation of the rotary platform 1. In alternative embodiments (not shown), the closed-loop cam and the cam followers can have other configurations well known in the art with an equivalent result.

The mount 14 includes structural elements (not shown) supporting a suction chamber 10 in a stationary position above the rotary platform 1. The suction chamber 10 has a perforated side wall 11 which is arranged parallel and adjacent to a portion of the path not centered with respect to the rotation axis E defined by the closed-loop cam 4. The suction chamber 10 has an air outlet 15 provided with a cylindrical coupling 15a whereby the suction chamber 10 is connected to a low pressure source by means of a suitable conduit (not shown).

The perforated side wall 11 has a plurality of holes 11a uniformly distributed along the length and width thereof, such that air is suctioned from the outside into the suction chamber 10 through the holes 11a of the perforated side wall 11. The sum of the area of passage of all the holes 11a is preferably approximately equivalent to the area of passage of the air outlet 15 of the suction chamber 10.

Each of the runners 5 has fixed thereto a retaining element 7 having a suction port 8 and a suction outlet 9 on opposite sides thereof. The suction port 8 is facing the peripheral region of the rotary platform 1 and the suction outlet 9 is facing the central region of the rotary platform 1. The suction outlet 9 is in direct communication with the suction port 8. The suction port 8 is suitable for retaining a container M in the retaining element 7 by suction.

The suction outlet 9 of each retaining element 7 moves in a path facing and adjacent to the perforated side wall 11 of the suction chamber 10 during a part of each rotation of the rotary platform 1, such that the suction chamber 10 creates an air suction flow through the suction port 8 of each retaining element 7 which retains a container M in the retaining element 7 by suction.

The mount 14 supports a support surface 24 arranged along a portion of the circumference of the rotary platform 1 and partially below the retaining elements 7. Containers M conveyed by the retaining elements 7 slide over the support surface 24 from an angular receiving position 24a (FIG. 3), in which one of the retaining elements 7 grips a container M from an infeed conveyor (not shown), to an angular delivery position 24b, in which this retaining element 7 delivers the container to an outfeed conveyor (not shown). The angular receiving and delivery positions 24a, 24b are fixed reference positions with respect to the mount 14.

The infeed and outfeed conveyors have respective support surfaces 25, 26 located at the same level as the support surface 24 of the rotary conveyor. The support surfaces 24, 25, 26 are associated with known stationary baffling elements and railing elements (not shown) cooperating in the guidance of containers M. In the illustrated embodiment, it is envisaged that the outfeed conveyor is a conventional fixed-pitch rotary conveyor (not shown) provided with a rotating shaft installed through an opening 17 (FIG. 3) existing in the mount 14, although the outfeed conveyor may alternatively be of any other type.

As illustrated in FIG. 3, containers M are conveyed in the infeed conveyor at a receiving pitch A, i.e., separated from one another by a first distance, and in accordance with the back and forth movement of the runners 5 in combination with the rotational movement of the rotary platform 1, contains M are delivered to the outfeed conveyor at a delivery pitch B, i.e., separated from one another by a second distance, the delivery pitch B being shorter than the receiving pitch A.

In the angular receiving position 24a (shown on the left side of FIGS. 3 and 4), the runners 5 are located in an outer limit position in relation to the back and forth movement thereof along the corresponding guiding element 2, whereas in the angular delivery position 24b (shown on the right side of FIGS. 3 and 4), the runners 5 are located in an inner limit position. Therefore, the radius of rotation of the runners 5 gradually decreases along the first portion of the rotation of the rotary platform 1 from the angular receiving position 24a to the angular delivery position 24b, and consequently the length of the arc between two retaining elements 7, equivalent to the pitch, is shortened accordingly.

The amplitude of the back and forth movement is selected such that the rotary conveyor with a change of pitch grips the containers M at a pitch equivalent to the receiving pitch A and delivers the containers M at a pitch equivalent to the delivery pitch B.

In an alternative embodiment (not shown), the rotary conveyor with suction and change of pitch of the present invention is configured for working inversely, i.e., receiving containers M from the infeed conveyor at a receiving pitch which is shorter than the delivery pitch at which containers M are delivered to the outfeed conveyor.

The amplitude of the back and forth movement of the runners 5 can be changed to adapt the rotary conveyor to different pitches, replacing the closed-loop cam 4 with another one that defines a different path. To that end, the closed-loop cam 4 can be formed by two or more segments fixed to the mount 14 by means of fixing elements, and the rotary platform 1 has wide notches covered by removable covers 28, such that by removing the removable covers 28 the fixing elements can be accessed and the closed-loop cam 4 extracted and replaced without having to disassemble the rotary platform 1.

The retaining elements 7 can also be replaced with other elements to adapt the rotary conveyor to different types of containers. To that end, each retaining element 7 is fixed to the corresponding runner by means of removable fixing elements.

The scope of the present invention is defined in the attached claims.

What is claimed is:

1. A rotary conveyor with suction and change of pitch for transferring containers, comprising:
   a rotary platform (1) rotating about a rotation axis (E);
   a plurality of guiding elements (2) fixed to said rotary platform (1);
   a plurality of grooves (3) formed in the rotary platform (1), each in a position parallel to one of said guiding elements (2), where the guiding elements (2) and said grooves (3) are uniformly distributed around said rotation axis (E) and extend from a peripheral region to a central region of the rotary platform (1);
   a stationary closed-loop cam (4) located below the rotary platform (1), said closed-loop cam (4) defining a path not centered with respect to the rotation axis (E);
   a plurality of runners (5), each being slidingly coupled to one of said guiding elements (2);
   a cam follower (6) assembled on each runner (5), said cam follower (6) being inserted through one of said grooves (3) and coupled to the closed-loop cam (4), whereby each runner (5) performs a back and forth movement along the corresponding guiding element (2) during one rotation of the rotary platform (1); and a plurality of retaining elements (7), each fixed to one of said runners (5) and provided with a suction port (8) suitable for retaining a container (M), each suction port (8) being in communication with a suction chamber (10) along a portion of each rotation of the rotary platform (1);

characterized in that:

said suction chamber (10) is supported in a stationary position above the rotary platform (1) and has a perforated side wall (11) parallel and adjacent to a portion of said path not centered with respect to the rotation axis (E) defined by the closed-loop cam (4), air being suctioned from the outside into the suction chamber (10) through said perforated side wall (11); and each of the retaining elements (7) has a suction outlet (9) in communication with the suction port (8), said suction outlet (9) moving in a path facing and adjacent to the perforated side wall (11) of the suction chamber (10) during a part of each rotation of the rotary platform (1).

2. The rotary conveyor with suction and change of pitch according to claim 1, characterized in that said path not centered with respect to the rotation axis (E) defined by the closed-loop cam (4) is a circular path having a center (C) located at an off-center distance (S) from the rotation axis (E) of the rotary platform (1).

3. The rotary conveyor with suction and change of pitch according to claim 1, characterized in that the closed-loop cam (4) defines a groove provided with opposing side surfaces and said cam follower (6) comprises a wheel rolling alternately on both of said side surfaces of the closed-loop cam (4) during one rotation of the rotary platform (1).

4. The rotary conveyor with suction and change of pitch according to claim 1, characterized in that the closed-loop cam (4) is fixed to a mount (14), where said mount (14) supports a drive shaft (16) coaxial with the rotation axis (E) and said drive shaft (16) is fixed to the rotary platform (1).

5. The rotary conveyor with suction and change of pitch according to claim 4, characterized in that said drive shaft (16) is connected by mechanical transmission to a motor which rotates the drive shaft (16) together with the rotary platform (1).

6. The rotary conveyor with suction and change of pitch according to claim 4, characterized in that said mount (14) furthermore supports the suction chamber (10) in said stationary position above the rotary platform (1).

7. The rotary conveyor with suction and change of pitch according to claim 4, characterized in that the mount (14) supports a support surface (24) over which the containers (M) slide when they are retained in the retaining elements (7) and conveyed by the rotary platform (1).

8. The rotary conveyor with suction and change of pitch according to claim 1, characterized in that the suction chamber (10) has an air outlet (15) connected to a low pressure source.

9. The rotary conveyor with suction and change of pitch according to claim 8, characterized in that the perforated side wall (11) of the suction chamber (10) has a plurality of holes (11a) distributed throughout same, and the sum of the area of passage of said plurality of holes (11a) is approximately equivalent to the area of passage of said air outlet (15).

10. The rotary conveyor with suction and change of pitch according to claim 2, characterized in that the closed-loop cam (4) defines a groove provided with opposing side surfaces and said cam follower (6) comprises a wheel rolling alternately on both of said side surfaces of the closed-loop cam (4) during one rotation of the rotary platform (1).

11. The rotary conveyor with suction and change of pitch according to claim 2, characterized in that the closed-loop cam (4) is fixed to a mount (14), where said mount (14) supports a drive shaft (16) coaxial with the rotation axis (E) and said drive shaft (16) is fixed to the rotary platform (1).

12. The rotary conveyor with suction and change of pitch according to claim 3, characterized in that the closed-loop cam (4) is fixed to a mount (14), where said mount (14) supports a drive shaft (16) coaxial with the rotation axis (E) and said drive shaft (16) is fixed to the rotary platform (1).

13. The rotary conveyor with suction and change of pitch according to claim 11, characterized in that said drive shaft (16) is connected by mechanical transmission to a motor which rotates the drive shaft (16) together with the rotary platform (1).

14. The rotary conveyor with suction and change of pitch according to claim 12, characterized in that said drive shaft (16) is connected by mechanical transmission to a motor which rotates the drive shaft (16) together with the rotary platform (1).

15. The rotary conveyor with suction and change of pitch according to claim 11, characterized in that said mount (14) furthermore supports the suction chamber (10) in said stationary position above the rotary platform (1).

16. The rotary conveyor with suction and change of pitch according to claim 12, characterized in that said mount (14) furthermore supports the suction chamber (10) in said stationary position above the rotary platform (1).

17. The rotary conveyor with suction and change of pitch according to claim 11, characterized in that the mount (14) supports a support surface (24) over which the containers (M) slide when they are retained in the retaining elements (7) and conveyed by the rotary platform (1).

18. The rotary conveyor with suction and change of pitch according to claim 12, characterized in that the mount (14) supports a support surface (24) over which the containers (M) slide when they are retained in the retaining elements (7) and conveyed by the rotary platform (1).

* * * * *